United States Patent
Barsness et al.

(10) Patent No.: US 7,912,851 B2
(45) Date of Patent: Mar. 22, 2011

(54) CACHING PAGES VIA HOST VARIABLE CORRELATION

(75) Inventors: Eric Lawrence Barsness, Pine Island, MN (US); Randy William Ruhlow, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1671 days.

(21) Appl. No.: 10/691,295

(22) Filed: Oct. 22, 2003

(65) Prior Publication Data

US 2005/0114303 A1 May 26, 2005

(51) Int. Cl.
*G06F 7/00* (2006.01)
*G06F 17/30* (2006.01)
(52) U.S. Cl. .................................................. 707/768
(58) Field of Classification Search ............. 707/1, 4, 707/5, 10, 3, 6
See application file for complete search history.

(56) References Cited

U.S. PATENT DOCUMENTS 6,006,225 A * 12/1999 Bowman et al. ............... 707/5

OTHER PUBLICATIONS

Sapia, "On Modeling and Predicting Query Behavior in OLAP Systems", Proceedings of the International Workshop on Design and Management of Data Warehouses, 1999.*

* cited by examiner

*Primary Examiner* — Michael J Hicks
(74) *Attorney, Agent, or Firm* — Owen J. Gamon

(57) ABSTRACT

A method, apparatus, system, and signal-bearing medium that in an embodiment track a history of statements that query data from a database. When a new statement is received, the history is searched for a correlation between the new statement and previous statements. The correlation is based on host variables in the history and the new statement. When a correlation is found, a prediction is made for the next statement to be received based on the previous statement in the history for which the correlation was found. The prediction is then used to retrieve pages from the database into a cache, which may be used by a subsequent statement.

13 Claims, 4 Drawing Sheets

| QUERY TEXT | HOST VARIABLE | TIMESTAMP | JOB ID | DATE |
|---|---|---|---|---|
| TEXT 1 | :HV1 | 12:00 | 123456 | 1/27/03 |
| TEXT 2 | :HV1 | 12:01 | 123456 | 1/27/03 |
| TEXT 1 | :HV1 | 11:01 | 444444 | 1/28/03 |
| TEXT 2 | :HV1 | 11:02 | 444444 | 1/28/03 |
| TEXT 1 | :HV1 | 1:00 | 643210 | 1/29/03 |
| TEXT 2 | :HV1 | 1:01 | 643210 | 1/30/03 |

TEXT 1: SELECT * FROM FILE1 WHERE XYZ = :HV1

TEXT 2: SELECT * FROM FILE2 WHERE ABC = :HV1

HISTORY DATA

FIG. 2

CACHING PAGES VIA HOST VARIABLE CORRELATION

FIELD

This invention generally relates to computers and more specifically relates to caching database pages via host variable correlation.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

One important use of computer systems is for retrieving data from a database. Many applications need to access multiple databases or multiple tables within a database. For example, a payroll application may need to access both an employee table that includes employee names and addresses and a tax table that contains information about withholding, exemptions, pensions, medical benefits, and insurance. The payroll application needs to issue multiple operations to the multiple databases or tables in order to perform its functions. Issuing multiple operations to multiple databases or tables adversely impacts performance of the application.

One current technique for dealing with the problem of poor performance with operations to multiple databases is to join the multiple databases into one database. Unfortunately, joining databases is often not feasible. For example, in the Enterprise Java Beans (EJB) environment, the database is abstracted from the application developer, and a join operation is not available. Also, often a join operation is undesirable because condition specified by the multiple operations is only similar, but not the same, so joining the multiple databases does not help performance.

Without a better way to handle operations against multiple databases, multiple tables, or multiple files, applications will continue to suffer from degraded performance. Although the aforementioned problems have been described in the context of Enterprise Java Beans, they can occur in any environment.

SUMMARY

A method, apparatus, system, and signal-bearing medium are provided that in an embodiment track a history of statements that query data from a database. When a new statement is received, the history is searched for a correlation between the new statement and previous statements. The correlation is based on host variables in the history and the new statement. When a correlation is found, a prediction is made for the next statement to be received based on the previous statement in the history for which the correlation was found. The prediction is then used to retrieve pages from the database into a cache, which may be used by a subsequent statement.

An embodiment of the invention includes a method comprising: finding a correlation between a first statement and a previous statement; predicting a second statement based on the previous statement; and retrieving at least one page from a database based on the second statement.

Another embodiment of the invention includes an apparatus comprising: means for finding a correlation between a first statement and a previous statement, wherein the previous statement is stored in a history of a plurality of statements; means for predicting a second statement based on the previous statement; and means for retrieving at least one page from a database based on the second statement.

Another embodiment of the invention includes a signal-bearing medium encoded with instructions, wherein the instructions when executed comprise: finding a correlation between a first statement and a previous statement, wherein the previous statement is stored in a history of a plurality of statements; predicting a second statement based on the previous statement; executing the first statement against a database; and retrieving at least one page from the database based on the second statement.

Another embodiment of the invention includes a server comprising: a processor; and a storage device encoded with instructions, wherein the instructions when executed on the processor comprise: finding a correlation between a first statement and a previous statement, wherein the previous statement is stored in a history of a plurality of statements, and wherein the finding the correlation further comprises finding a host variable in a history that matches the host variable in the first statement, predicting a second statement based on the previous statement, executing the first statement against the database, and retrieving at least one page from a database based on the second statement.

BRIEF DESCRIPTION OF THE DRAWINGS

FIG. 2 depicts a block diagram of an example history data structure, according to an embodiment of the invention.

DETAILED DESCRIPTION

Figure 1:
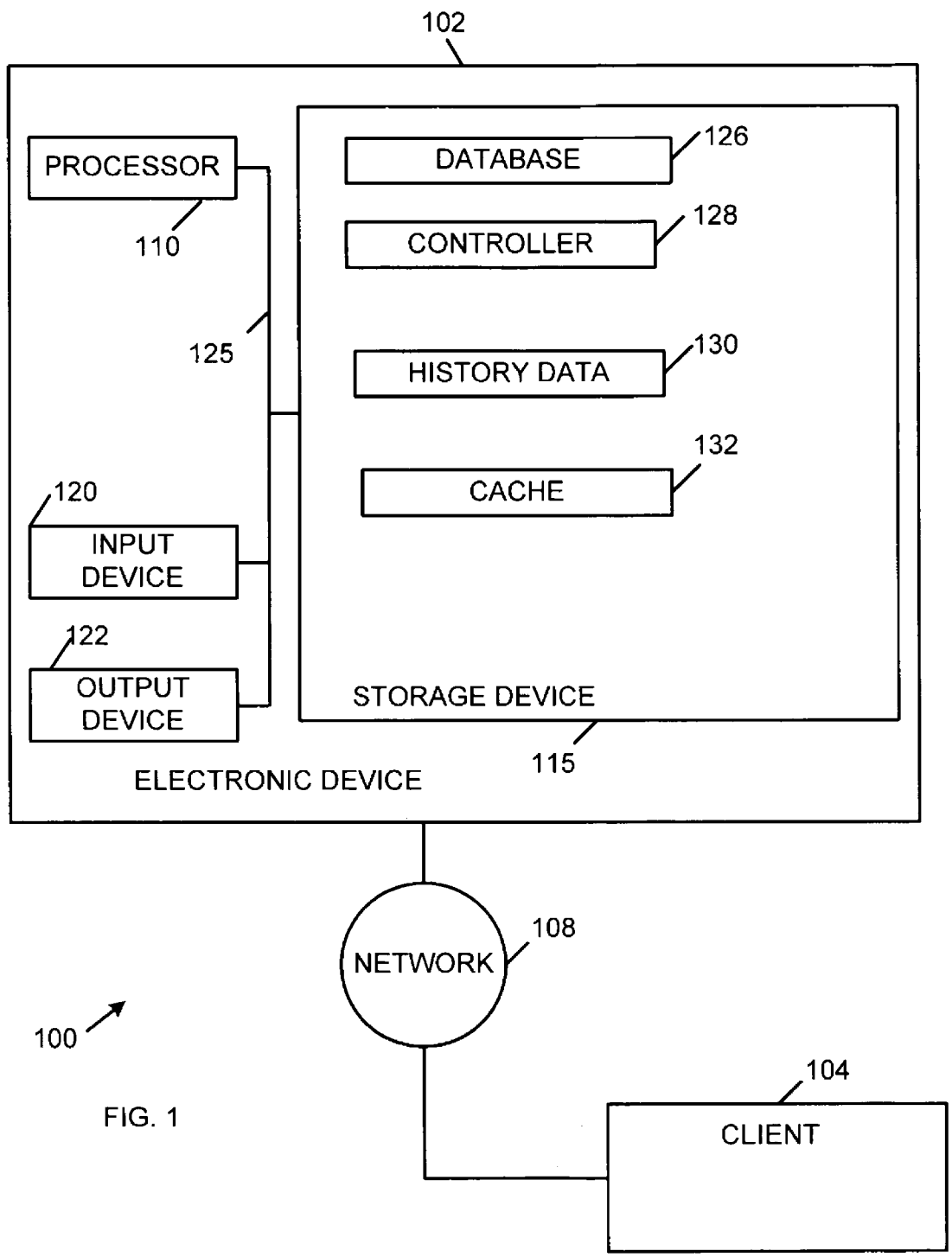
FIG. 1 depicts a block diagram of an example system for implementing an embodiment of the invention.

Referring to the Drawing, wherein like numbers denote like parts throughout the several views, FIG. 1 depicts a block diagram of an example system 100 for implementing an embodiment of the invention. The system 100 includes an electronic device 102 connected to a client 104 via a network 108. Although only one electronic device 102, one client 104, and one network 108 are shown, in other embodiments any number or combination of them may be present. Although the electronic device 102, the client 104, and the network 108 are illustrated in FIG. 1 as being discrete, separate components, in other embodiments some or all of their functions and elements may be combined.

In an embodiment, the electronic device 102 functions as a server. The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 108, the input device 120, and/or the output device 122.

Although the electronic device 102 is drawn to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Although the storage device 115 is shown in FIG. 1 as a single monolithic entity, the storage device 115 may in fact be distributed and/or hierarchical, as is known in the art. For example, the storage device 115 may exist in multiple levels of storage devices, and these levels of storage devices may be further divided by function, so that one level of storage device holds, e.g., instructions while another holds, e.g., non-instruction data which is used by the processor or processors. The storage device 115 may further be distributed and associated with different processors or sets of processors, as is known in any of various so-called non-uniform memory access (NUMA) computer architectures. Further, although the electronic device 102 is drawn to contain the storage device 115, it may be distributed across other electronic devices, such as electronic devices connected to the network 108.

The storage device 115 includes a database 126, a controller 128, history data 130, and a cache 132, all of which may in various embodiments have any number of instances. Although the database 126, the controller 128, the history data 130, and the cache 132 are all illustrated as being contained within the storage device 115 in the electronic device 102, in other embodiments some or all of them may be on different electronic devices and may be accessed remotely, e.g., via the network 108.

The database 126 may be any collection of data. In an embodiment, the data in the database 126 is perceived by the user or the client 104 as a collection of tables. A table typically includes a row of column names specifying one or more attribute fields, and zero or more data rows containing a value for each of the column fields. For example, an employee table might contain columns of employee id, name, address, telephone number, and salary, with a data row for each employed person, but in another embodiment any appropriate columns may be used. Data in the data rows of the database 126 is retrieved via queries, which the controller 128 may carry out via a variety of high-level commands or statements.

The controller 128 keeps a history of the statements in the history data 130, analyzes the history data 130 for a correlation between the history data and a current statement based on a host variable, predicts the next statement based on the correlation, and caches pages from the database 126 in the cache 132 based on the prediction. The history data 130 is further described below with reference to FIG. 2.

In an embodiment, the controller 128 includes instructions capable of executing on the processor 110 or statements capable of being interpreted by instructions executing on the processor 110 to carry out the functions as further described below with reference to FIGS. 3 and 4. In another embodiment, the controller 128 may be implemented in hardware via logic gates and/or other appropriate hardware techniques in lieu of or in addition to a processor-based system.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of the electronic device 102, if any.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of the electronic device 102, if any.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although the bus 125 is shown in FIG. 1 as a relatively simple, single bus structure providing a direct communication path among the processor 110, the storage device 115, the input device 120, and the output device 122, in other embodiments the bus 125 may comprise multiple different buses or communication paths, which may be arranged in any of various forms, such as point-to-point links in hierarchical, star or web configurations, multiple hierarchical buses, or parallel and redundant paths. Furthermore, while the bus 125 is shown directly connected to the processor 110, the storage device 115, the input device 120, and the output device 122, in other embodiments, some or all of the I/O (Input/Output) devices may be connected via I/O processors.

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The client 104 may be an electronic device including hardware and optional software components analogous to the electronic device 102 previously described above. The client 104 sends requests for information to the electronic device 102 and receives responses from the electronic device 102.

The network 108 may be any suitable network or combination of networks and may support any appropriate protocol suitable for communication of data and/or code to/from the electronic device 102 and/or between the electronic device 102 and the client 104. In various embodiments, the network 108 may represent a storage device or a combination of storage devices, either connected directly or indirectly to the electronic device 102 and the client 104. In an embodiment, the network 108 may support Infiniband. In another embodiment, the network 108 may support wireless communications. In another embodiment, the network 108 may support hard-wired communications, such as a telephone line or cable. In another embodiment, the network 108 may support the Ethernet IEEE (Institute of Electrical and Electronics Engineers) 802.3x specification. In another embodiment, the network 108 may be the Internet and may support IP (Internet Protocol). In another embodiment, the network 108 may be a local area network (LAN) or a wide area network (WAN). In another embodiment, the network 108 may be a hotspot service provider network. In another embodiment, the network 108 may be an intranet. In another embodiment, the network 108 may be a GPRS (General Packet Radio Service) network. In another embodiment, the network 108 may be a FRS (Family Radio Service) network. In another embodiment, the network 108 may be any appropriate cellular data network or cell-based radio network technology. In another embodiment, the network 108 may be an IEEE 802.11B wireless network. In still another embodiment, the network 108 may be any suitable network or combination of networks. Although one network 108 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 108, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for the history data 130. The history data 130 includes a history of statements that were previously performed by the controller 128 against the database 126. The history data 130 includes records 205, 210, 215, 220, 225, and 230, each associated with a previous statement, but in other embodiments any number of records may be present. Each record includes a number of fields, such as a query text field 235, a host variable field 240, a timestamp field 245, a job identifier field 250, and a date field 255.

The query text field 235 includes the text of a statement or command that the controller 128 previously executed against the database 126. Records 205, 215, and 225 contain "text1" in their query text field 235 and records 210, 220, and 230 contain "text2" in their query text field 235. Text1 is used to indicate "select * from file1 where xyz=:hv1" and text2 is used to indicate "select * from file2 where abc=:hv1". Notice that the two select statements are querying from different files (file1 versus file2) and from different attributes or columns (xyz versus abc) but are using the same host variable (:hv1).

Examples of commands or statements that may be saved in the query text field 235 are the select, insert, update, and delete statements in standard SQL (Structured Query Language), which is a database access language used on many different computer platforms. But, in other embodiments any appropriate database access language and statements may be used.

A select statement specifies the desired attributes for the controller 128 to return from a specified table (e.g., the file1 table or the file2 table) in the database 126 where some specified condition is true. In this example, a "*" in the select statement means that the controller 128 returns all attributes from the file1 or file2 table for all records that meet the condition in the "where" clause. The where clause includes one or more literals, each of which includes at least one attribute or column (e.g., xyz or abc), an operator (e.g., "="), and either a constant value or another attribute, such as host variable.

Host variables are a technique that allows the passing of values between the database 126 and the client 104. The host variable associated with the query text 235 is stored in the host variable field 240. A user or an application program at the client 104 can set the host variable (e.g., ":hv1") to any desired value or values in succession and then submit the statement to the database 126 via the controller 128. The host-variable query may then be reused several times, each time specifying different constant values for host variables. A host variable is either: 1) a variable in a host language such as a C variable, a C++ variable, a COBOL data item, a FORTRAN variable, or a Java variable; or 2) a host language construct that is generated by an SQL precompiler from a variable declared using SQL extensions that is referenced in an SQL statement. Host variables are either directly defined by statements in the host language or are indirectly defined using SQL extensions.

Host variables are not restricted to select statements, but can also be used in other statements, such as statements that receive information from the database (e.g., select into, fetch, call, and set); statements that assign values to columns in the database (e.g., call, insert, and update); and statements that manipulate information taken from the database or contained in other variables (in expressions) to get descriptor and diagnostics information (get descriptor, set descriptor, and get diagnostics).

Host variables can also be used in dynamic SQL statements, where they take the form of parameter markers. In dynamic SQL statements, a parameter marker is a question mark (?) representing a position in the statement where the application will provide a value; that is, the position where a host variable would be found if the statement string were a static SQL statement.

In the example shown, all the records 205, 210, 215, 220, 225, and 230 contain ":hv1" as the contents of their host variable field 240, but in other embodiments the host variable may take any appropriate form and may include any number of host variables.

The timestamp field 245 identifies the time of day at which the statement in the associated query text 235 was executed. The job identifier field 250 identifies the job, process, thread, or method that initiated, requested, or executed the statement in the associated query text 235. In the example shown, the "123456" job initiated the statements associated with records 205 and 210; the "444444" job initiated the statements associated with records 215 and 220; and the "643210" job initiated the statements associated with the records 225 and 230. The date field 255 identifies the day, month, and/or year on which the statement in the associated query text field 235 was executed. The data illustrated in FIG. 2 is exemplary only and in other embodiments any appropriate data may be used.

Figure 3:
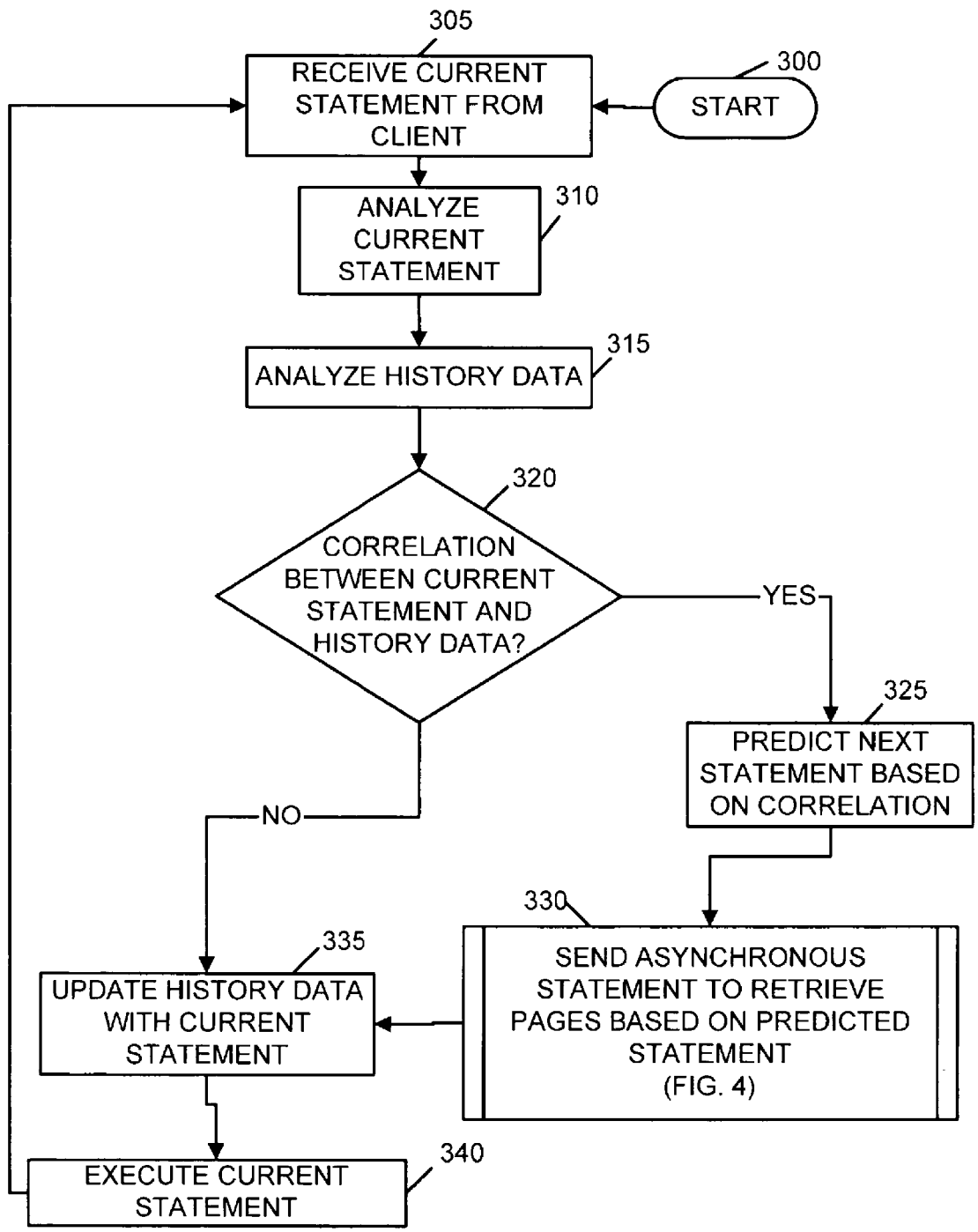
FIG. 3 depicts a flowchart of example processing for analyzing a correlation between the history data structure and a current statement, according to an embodiment of the invention.

FIG. 3 depicts a flowchart of example processing for the controller 128, according to an embodiment of the invention. Control begins at block 300. Control then continues to block 305 where the controller 128 receives a current statement from the client 104. Control then continues to block 310 where the controller 128 analyzes the current received statement to determine, what host variables are associated with the current statement from the client 104 and to determine what job, process, thread, or method is associated with the current statement.

Control then continues to block 315 where the controller 128 analyzes the history data 130 comparing the host variables of the current statement to the host variable field 240 and comparing the current job to the contents of the job identifier field 250 of the records in the history data 130.

Control then continues to block 320 where the controller 128 determines whether a correlation exists between the current statement that was received at block 305 and a previous statement stored in one of the records in the history data 130. In an embodiment, a correlation exists between the current statement and a record in the history data 130 if at least one host variable in the current statement exists in the host variable field 240 and the job identifier associated with the current statement matches the contents of the job identifier 250 field. In another embodiment, the job identifier field 250 is not used. In another embodiment, a correlation exists if the host variable in the current statement matches a host variable in the host variable field 240 and the data supplied for the host variable in the current statement either matches or is a derivative of the data associated with the host variable in the host variable field 240.

If the determination at block 320 is true, then control continues to block 325 where the controller 128 predicts the next statement based on the correlation between the current statement and the previous statement found in one of the records in the history data 130. In an embodiment, the controller 128 predicts the next statement by finding the next record in time in the job based on the timestamp 245 and the date 255 from the previous record that was found at block 320. For example, if the controller 128 finds a correlation between the current statement and record 215, then the controller 128 predicts at block 320 that the next statement will be the statement in the query text field 235 in the record 220, since record 220 is the next record in time in the job 444444 based on the timestamp field 245 and the date field 255 in the records 215 and 220.

Control then continues to block 330 where the controller 128 sends an asynchronous request to retrieve pages based on the predicted statement as further described below with reference to FIG. 4. After sending the asynchronous request, control then continues to block 335 where the controller 128 updates the history data 130 with the current statement by storing its data in the query text field 235, the host variable field 240, the timestamp field 245, the job identifier field 250, and the date field 255 of a new record.

Control then continues to block 340 where the controller 128 executes the current statement. The controller 128 either executes the current statement against the database 128 or against pages in the cache 132, depending on whether the current statement was predicted by a previous iteration of the logic of FIG. 4 and whether that previous prediction resulted in pages of data from the database 128 being cached in the cache 132 by the asynchronous logic of FIG. 4, as further described below. Control then returns to block 305 where the controller 128 receives the next statement, as previously described above. If the prediction is accurate the next statement will include a host variable that matches the host variable in the predicted statement, and the next statement will be able to use the pages that the logic of FIG. 4 is asynchronously retrieving from the database and storing in the cache 132, as further described below.

If the determination at block 320 is false, then control continues to block 335, as previously described above.

Figure 4:
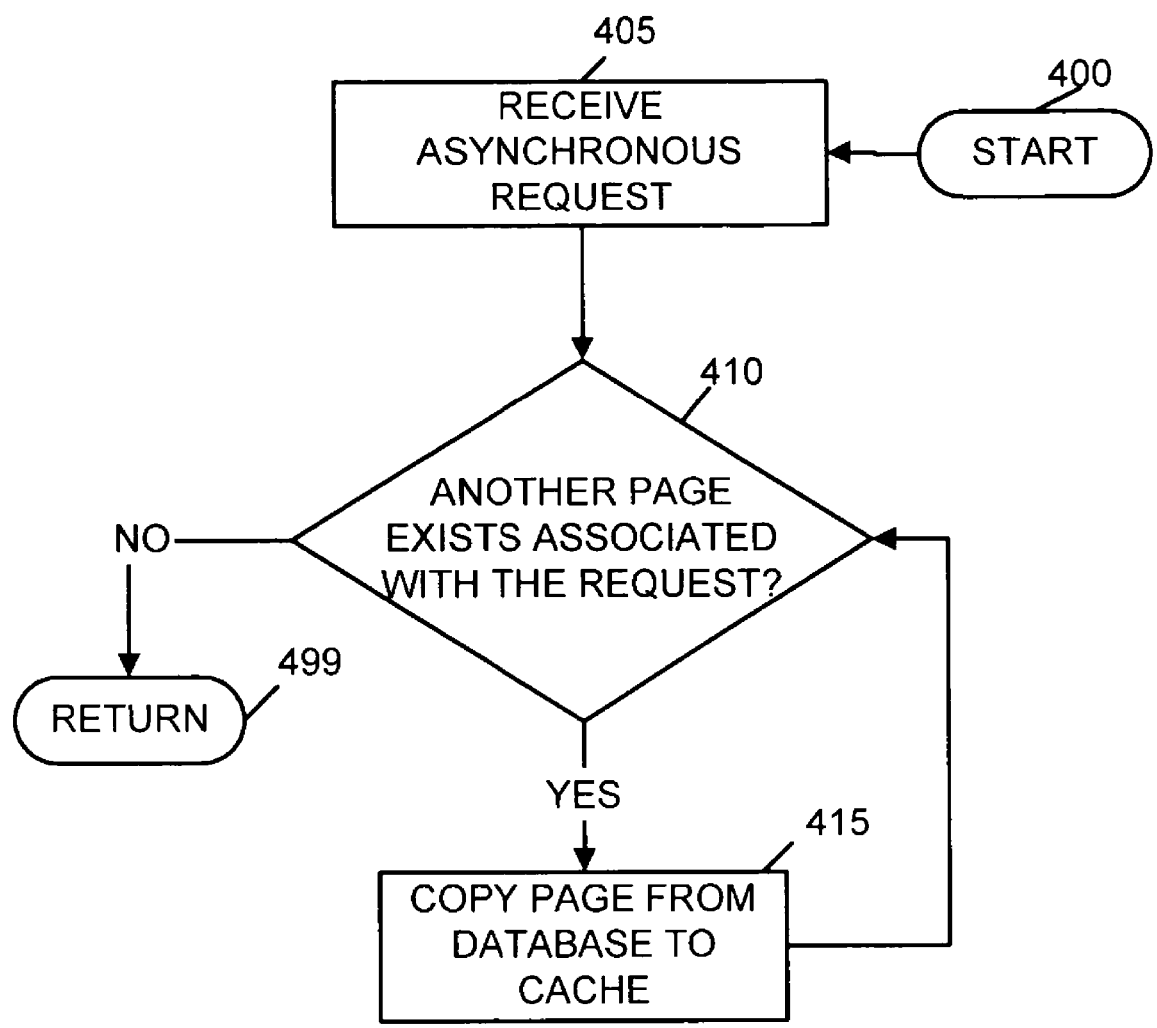
FIG. 4 depicts a flowchart of example processing for asynchronously caching pages from a database, according to an embodiment of the invention.

FIG. 4 depicts a flowchart of example processing for asynchronously caching pages of data from the database 126, according to an embodiment of the invention. Control begins at block 400. Control then continues to block 405 where the controller 128 receives a request to retrieve pages from the database 126. Control then continues to block 410 where the controller 128 determines whether a page exists that is associated with the predicted statement. In an embodiment, the controller 128 makes the determination by executing the predicted statement against the database 126. If the determination at block 410 is true, then control continues to block 415 where the controller 128 copies the retrieved page from the database 126 to the cache 132. Control then returns to block 410, as previously described above.

If the determination at block 410 is false, then control continues to block 499 where the logic of FIG. 4 completes.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   finding a correlation between a first statement and a previous statement, wherein the finding the correlation further comprises finding a host variable in the previous statement in a history that matches a host variable in the first statement, wherein first data supplied for the host variable in the first statement matches previous data associated with the host variable in the previous statement, wherein the host variable in the previous statement and the host variable in the first statement comprise a variable in a host language that is set to a plurality of values in succession and submitted to a database;
   predicting a second statement based on the previous statement, wherein the predicting further comprises finding the previous statement in the history and finding the second statement that was next in time following the previous statement in the history, wherein the previous statement and the second statement comprise commands that were previously executed against the database; and
   retrieving at least one page from the database based on the second statement, wherein the retrieving further comprises executing the second statement against the database.

2. The method of claim 1, wherein the retrieving further comprises:
   retrieving the at least one page asynchronously from executing the first statement against the database; and
   storing the at least one page in a cache.

3. An apparatus comprising:
   means for finding a correlation between a first statement and a previous statement, wherein the previous statement is stored in a history of a plurality of statements, wherein the finding the correlation further comprises finding a host variable in the previous statement in the history that matches a host variable in the first statement, wherein first data supplied for the host variable in the first statement matches previous data associated with the host variable in the previous statement, wherein the host variable in the previous statement and the host variable in the first statement comprise a variable in a host language that is set to a plurality of values in succession and submitted to a database;
   means for predicting a second statement based on the previous statement, wherein the means for predicting further comprises means for finding the second statement that was next in time following the previous statement in the history, wherein the previous statement and the second statement comprise commands that were previously executed against the database; and
   means for retrieving at least one page from the database based on the second statement, wherein the means for retrieving further comprises means for executing the second statement against the database.

4. The apparatus of claim 3, further comprising:
   means for saving the first statement in the history.

5. The apparatus of claim 3, wherein the means for retrieving further comprises:
   means for retrieving the at least one page asynchronously from executing the first statement against the database; and
   means for storing the at least one page in a cache.

6. The apparatus of claim 5, further comprising:
   means for executing a next statement against the cache, wherein the next statement follows the first statement in time, and wherein a host variable in the next statement matches the host variable in the second statement.

7. A storage device encoded with instructions, wherein the instructions when executed comprise:
   finding a correlation between a first statement and a previous statement, wherein the previous statement is stored in a history of a plurality of statements, wherein the finding the correlation further comprises finding a host variable in the previous statement in the history that matches a host variable in the first statement, wherein first data supplied for the host variable in the first statement matches previous data associated with the host variable in the previous statement, wherein the host variable in the previous statement and the host variable in the first statement comprise a variable in a host language that is set to a plurality of values in succession and submitted to a database;
   predicting a second statement based on the previous statement, wherein the predicting further comprises finding the second statement that was next in time following the previous statement in the history, wherein the previous statement and the second statement comprise commands that were previously executed against the database;
   executing the first statement against the database; and
   retrieving at least one page from the database based on the second statement, wherein the retrieving further comprises executing the second statement against the database.

8. The storage device of claim 7, wherein the retrieving further comprises:
   retrieving the at least one page asynchronously from the executing the first statement.

9. The storage device of claim 7, further comprising:
   storing the at least one page in a cache.

10. The storage device of claim 9, further comprising:
    executing a next statement against the cache, wherein the next statement follows the first statement in time, and wherein a host variable in the next statement matches the host variable in the second statement.

11. A server comprising:
    a processor; and
    a storage device encoded with instructions, wherein the instructions when executed on the processor comprise:
       finding a correlation between a first statement and a previous statement, wherein the previous statement is stored in a history of a plurality of statements, and wherein the finding the correlation further comprises finding a host variable in the previous statement in the history that matches the host variable in the first statement, wherein first data supplied for the host variable in the first statement matches previous data associated with the host variable in the previous statement, wherein the host variable in the previous statement and the host variable in the first statement comprise a variable in a host language that is set to a plurality of values in succession and submitted to a database,
       predicting a second statement based on the previous statement, wherein the predicting further comprises finding the second statement that was next in time following the previous statement in the history, wherein the previous statement and the second statement comprise commands that were previously executed against the database, executing the first statement against the database, retrieving at least one page from a database based on the second statement, wherein the retrieving further comprises executing the second statement against the database, storing the at least one page in a cache, and executing a next statement against the at least one page in the cache, wherein the next statement follows the first statement in time, and wherein the host variable in the next statement matches the host variable in the second statement.

12. The server of claim 11, wherein the retrieving further comprises:
  retrieving the at least one page asynchronously from the executing the first statement.

13. The server of claim 11, wherein the finding the correlation further comprises:
  finding the previous statement, wherein the previous statement is associated with a same job as the first statement.

* * * * *